Jan. 26, 1965   A. VINDEVOGEL   3,167,675
DYNAMO-ELECTRIC MACHINE HAVING LAMELLAR
WINDINGS AND PLANE AXIAL AIR GAP
Filed Dec. 12, 1962   3 Sheets-Sheet 1
PRIOR ART
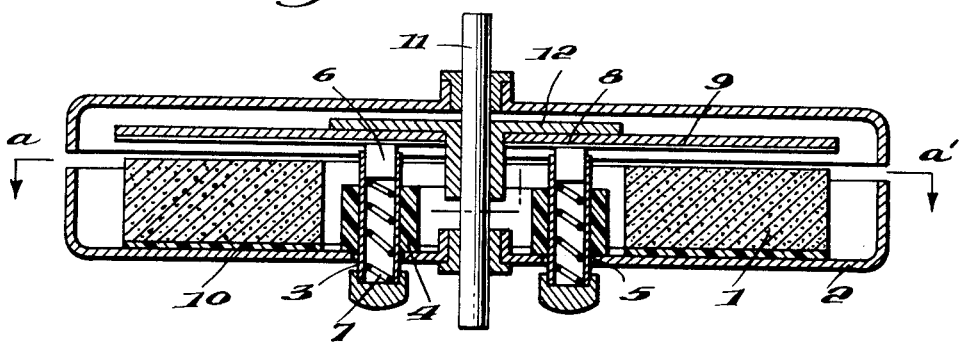
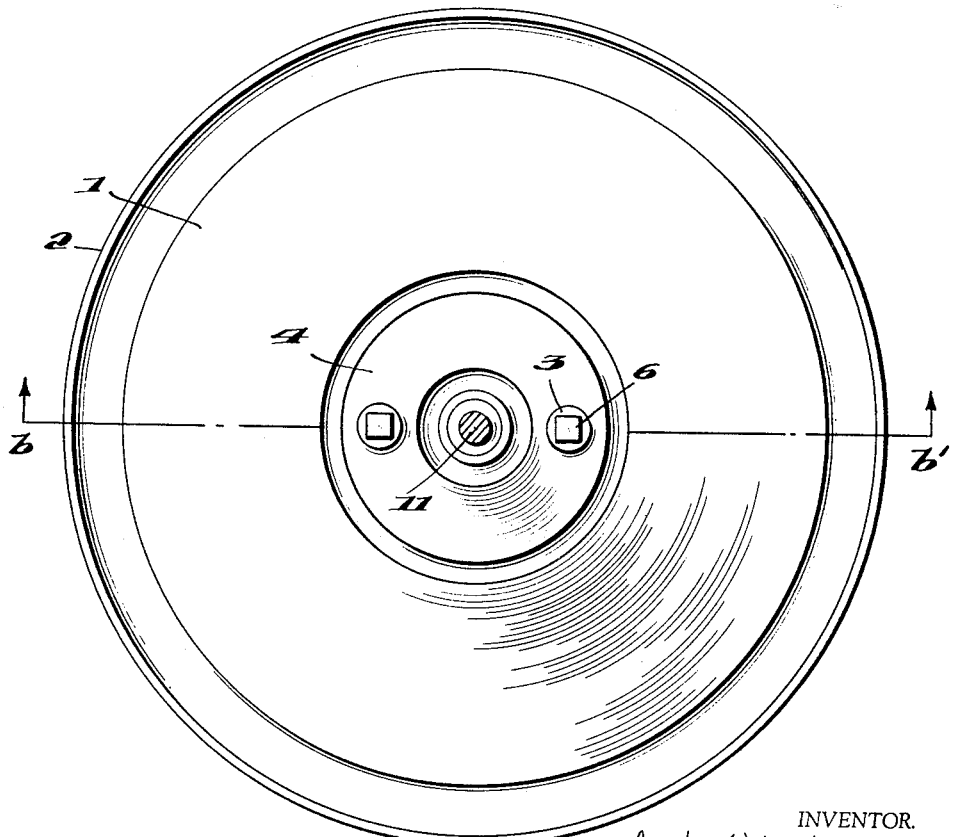
INVENTOR.
André Vindevogel
BY
Pierce, Scheffler & Parker
ATTORNEYS

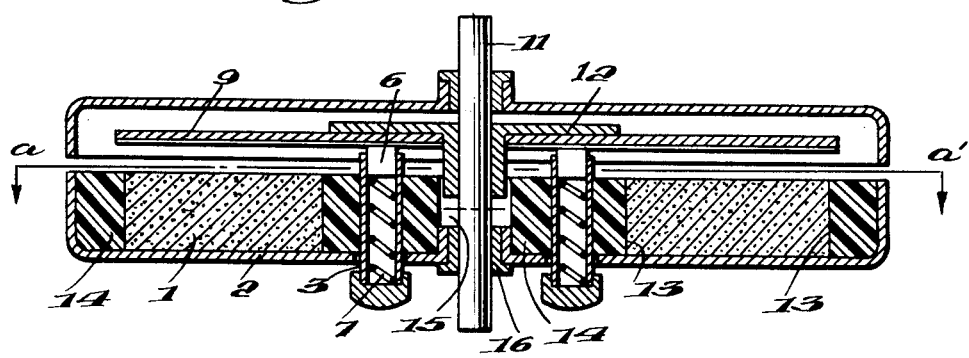
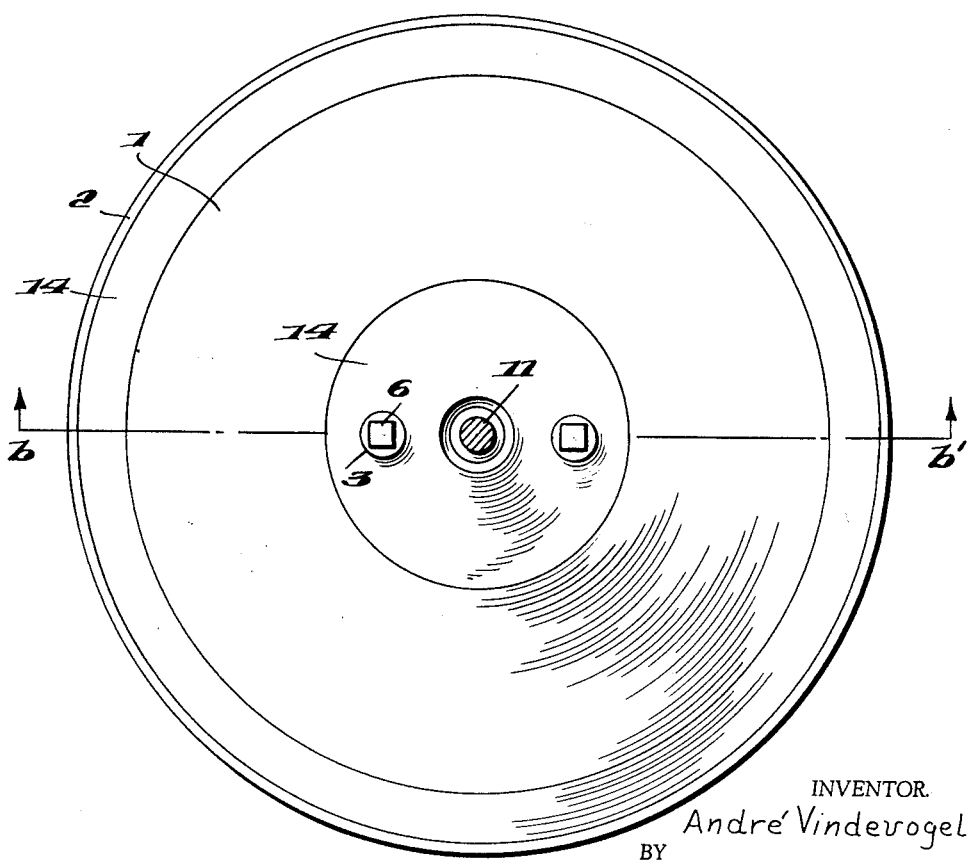

INVENTOR.
André Vindevogel

United States Patent Office 3,167,675
Patented Jan. 26, 1965

3,167,675
DYNAMO-ELECTRIC MACHINE HAVING LAMELLAR WINDINGS AND PLANE AXIAL AIR GAP
André Vindevogel, St.-Ouen, France, assignor to Compagnie Electro-Mecanique, Paris, France, a French body corporate
Filed Dec. 12, 1962, Ser. No. 244,168
Claims priority, application France, Dec. 21, 1961, 882,726
8 Claims. (Cl. 310—239)

This invention relates to dynamo-electric machines such as motors and the like of the type having a planar axial air gap between the rotor and stator elements and wherein the electrical windings are of the planar lamellar type.

Dynamo-electric machines of the type referred to comprise generally a ring-shaped magnetic field member secured to a yoke of soft iron which ensures closing of the magnetic circuit, this yoke constituting a part of the casing for the machine. The magnetic field member is sometimes constituted by an annulus of magnetized ferrite, the magnetization around the annulus being so arranged as to provide a succession of North poles alternating with South poles. In an alternative construction, the magnetic field member may be constituted by a ring-shaped assembly of structurally independent magnets of the proper polarity and these magnets are then usually of the so-called permanent type made from Alnico or the like.

In either case, i.e. a magnetic field member constituted by a magnetized annulus of ferrite or a plurality of independent magnets arranged in a ring, the magnetic field member has, prior to the present invention, been secured in place on the yoke-casing of the machine by means of an adhesive, generally an epoxy resin, the adhesion being effected in a suitable heating chamber where the component parts with the resin layer therebetween are brought to the polymerization temperature of the resin. Tubular insulating supports of a suitable hard plastic material are then secured to the casing inside the ring of the magnetic field member and within these tubular supports are inserted sleeves of conductive material which serve as brush-holders, these sleeves being secured in place within the tubular supports by adhesive. Within each brush-holder sleeve is a brush which is spring loaded so as to engage the collector part of the lamellar windings on the rotor disc which is secured to the rotor shaft of the machine. Current is supplied to the lamellar windings, in the case of a motor, and hence causes the rotor to rotate.

The previously known construction which has been described above has serious disadvantages. Cooling of the machine is insufficient, excessive vibrations are caused by the brushes and, in the case where the magnetic field member is constituted by an annulus of magnetized ferrite, fractures of the ferrite ring may often occur. In fact, during operation of the machine, the brushes and brush holders are the seat of a considerable increase in temperature and constitute the hottest part of the machine. Since these elements are confined within a support of electrical insulating material, which is a poor conductor of heat, the heat generated at the brushes and brush-holders cannot be transmitted through them to the metallic casing which, because of its surface contact with the surrounding air would otherwise permit a rapid removal of this heat. The machine is thus insufficiently cooled.

The mechanical vibrations produced by the passage of the collector parts of the lamellar conductors under and in surface contact with the brushes are transmitted to the machine casing through the insulating supports for the brush-holders which are made of a relatively hard material and thus have no damping effect on the vibrations. This makes the machine quite noisy.

In addition, the fastening of the ferrite ring by its base to the casing by means of a resin layer, which becomes very hard after polymerization, results in contractions, due to the great difference between the coefficients of thermal expansion of the ferrite and of the metal constituting the case. This has the result that certain ferrites break, cleave or do not stick.

The present invention is directed to a new and improved method for fastening ferrites and brush-holders to the casing, providing an improvement in the operation of the machine by eliminating the above indicated disadvantages and reducing the cost price by simplifying the assembly operations.

The assembling method according to the invention is characterized in that the magnetic field member such as the magnetized annular ring of ferrite or independent magnets, the brush holders and possibly other elements are sealed in a single assembly on the yoke and/or the case which may be stationary or rotatable, by means of suitable plastic coating and filling materials, whether mixed with a mineral charge or not, the solidified assembly damping the sound vibrations due to the commutation and facilitating the desired rapid heat exchange between the machine and the outside atmosphere.

The following specification, based on the attached drawings which are given by way of example, will facilitate the understanding of how the invention can be realized, the details resulting from the text as well as from the drawings forming a part of the said invention.

FIGS. 1 and 2 represent a machine of known design, in a section along the axis b–b' of FIG. 2 and in a half section respectively along the axis a–a' of FIG. 1.

FIGS. 3 and 4 show a machine according to the invention, in a section along the axis b–b' of FIG. 4 and in a half-section respectively along the axis a–a' of FIG. 3.

Figure 5:
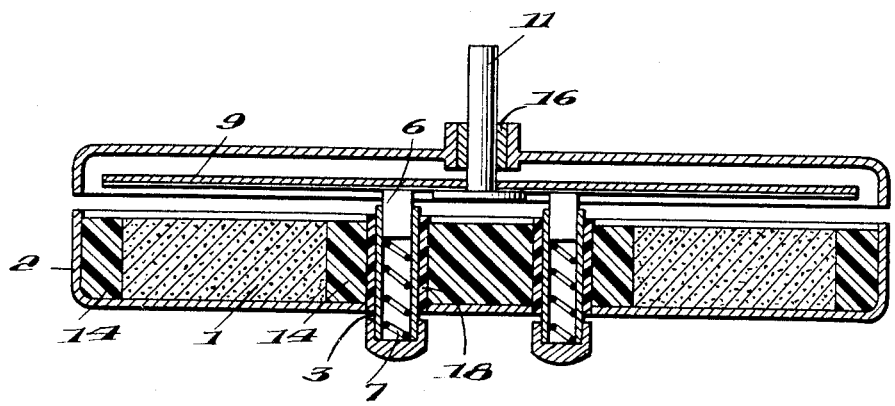
FIGS. 5 and 6 show respectively two variants of the machine according to the invention, one with a single bearing for the machine shaft constituted by a self-lubricating, uncoated bushing, the other with two self-lubricating axially spaced coated bushings for the shaft.

In FIG. 1, the annular field magnet 1 of magnetized ferrite of a machine of known design is glued by means of a layer of epoxy resin 10 on the yoke of soft iron 2 forming the case of the machine. Metallic brush-holder sleeves 3 are glued in an annular support 4 of hard plastic, electrically insulating material, fastened by screws on the case 2; holes 5 in the latter permit the brush-holders to pass with a certain clearance which insulates them from the case. The brushes 6 are pushed by springs 7 against the collecting part 8 of the lamellar windings of the rotor 9. The latter is secured to the flanged part of a collar 12 of insulating material which in turn is secured upon the shaft 11 of the machine.

The above described machine has the shortcomings mentioned above: insufficient cooling of the brush-holders, vibrations transmitted by the latter, and dangerous contractions in the ferrit glued only by its base to the machine casing.

In the machine according to the invention (FIGS. 3 and

4), the annular ferrite 1 is no longer fastened by its base but rather by its inner and outer walls 13; the brush-holders 3 are not glued to tubular insulating supports. The annular ferrite and the brush-holders 3 are temporarily held in the case by a positioning mounting, and a material 14 in liquid form is introduced in sufficient quantity to fill the spaces inside the case to the desired level i.e. inside the annular ferrite 1 and between the outer periphery of the latter and the inside surface of the casing wall and to coat the annular ferrite and the brush-holders at the same time. A cylindrical passage 15 is provided first for the flanged collar 12, the shaft 11 and the bushing 16 for shaft 11 inside the annular ferrite 1.

When the filling and coating material 14 specified below solidifies, it adheres firmly to the case 2 and to the elements which it surrounds, thus constituting a compact assembly damping the vibrations and dissipating the heat. In addition since the ferrite is completely coated, the mechanical accidents described above are no longer likely to occur. The bushing 16, shaft 11, flanged collar 12 and rotor 9 are then assembled in the casing 2.

The filling and coating material used, which must be selected with properties particularly suitable for the intended use, can be thermoplastic or thermosetting. It is used as such, or mixed with mineral charge. In certain machines, a supple coating material is used first around the vibrant pieces, such as the brush-holders, to absorb the vibrations and to attenuate the noise, then, this supple material and the annular ferrite are enveloped with a hard coating material, charged with mineral or metal powder to permit the elimination of heat.

The base materials can be by way of non-limiting examples, polyethylenes, polyesters alone or in combination with triallyl cyanate for use at high temperature (260 deg. C.), or polyurethanes.

The charge material for the base materials can be for example silicon, antimony oxide, magnesium aluminosilicate, aluminum powder etc.

By suitable combinations of the base materials and of the charges one thus obtains coating products which have:

(a) an elasticity conferring an elongation of 200 to 500% (absorption of vibration)

(b) a resistance to compression of 18 kg./mm.² and a modulus of elasticity of 1500 kg./mm.² (fastening of the pieces subjected to mechanical stresses)

(c) a heat conductivity of close to that of metals (elimination of heat)

FIG. 5 shows an embodiment with a single bearing which illustrates what has been described above. The brush-holders 3 which consist of tubular bodies made of brass, have first been coated with a supple polyethylene cover 18, then secured on the cylindrical case 2 together with the annular ferrite 1 by means of a material 14 consisting for example, of a polyester charged with aluminum powder, and filling, in the liquid state, the spaces inside the case 2 between the latter and the exterior periphery of the annular ferrite 1, and also inside of the opening within the annular ferrite 1 except for the spaces occupied by the brush-holders.

This cover 18, due to its small thickness, has a sufficient thermal conductivity for the heat produced in the rotor to be transmitted to the coating mass 14 whose high conductivity permits cooling of the assembly by the outer wall of the case in contact with the surrounding atmosphere.

Figure 6:
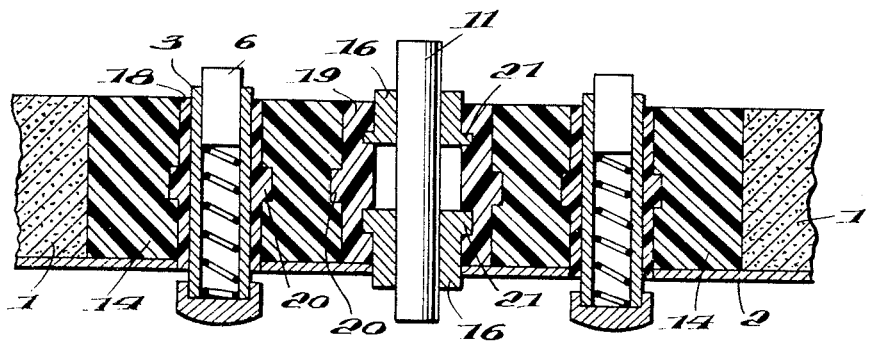

FIG. 6 represents an embodiment of the machine with two axially spaced self-lubricating bushes 16 for the shaft 11 in which a supporting sleeve 19 of insulating material for the bushes is likewise provided, but of hard plastic material with a very low thermal conductivity and high mechanical resistance, this sleeve 19 being first produced in a mold. The brass brush-holder sleeves 3 coated with their supple tubular covers 18 and the coated bushings are secured on the casing 2 together with the annular ferrite 1 by means of a thermoplastic or thermosetting filling- and coating material 14, charged, for example, with aluminum-powder. In order to reinforce the anchorage of the pieces to be sealed, peripheral flanges 20 may be provided on the tubular covers 18 and sleeve 19, and bushings 16 may similarly be provided with peripheral flanges 21.

The assembly thus obtained has the following characteristics and advantages:

(a) a considerable reduction of the commutation noise, thanks to the elastic cover sleeves 18.

(b) good removal of the heat supplied by the brushes, thanks to the metal charger of the filling material in contact with the case 2.

(c) non-transmission of the major part of the heat to the shaft bushings 16 thanks to the heat insulating sleeve 19, which preserves the self-lubricating quality of the friction rings of the bushes, since the oil with which they are impregnated is not changed by the heat.

Naturally the invention is also applicable in cases where the lamellar windings are fixed inside the machine and the field magnet and casing part to which it is secured constitutes the rotor.

The filling- and coating materials mentioned above have only been indicated by way of example; they can be replaced by any other plastic material that has the same properties and that can be used as such or in mixture.

I claim:

1. In a dynamo-electric machine of the type having as elements an annularly configured magnetic field member, a shaft and a disc secured to said shaft and having lamellar type windings thereon arranged in confronting relation to one face of the magnetic field member to establish an axial planar air gap therebetween, brushes arranged in tubular brush holders located within the annular magnetic field member, and a casing within which said elements are disposed, the improvement wherein said annular magnetic field member and said tubular brush holders are at first temporarily held in their respective proper positions within said casing and are thereafter permanently and simultaneously secured in said positions by an in situ molded mass of plastic material having a good heat conductivity characteristic, said plastic mass filling the space between the casing wall and the external periphery of said annular magnetic field member and being adherent thereto and said plastic mass also being included within and in contact with and adhering to the internal periphery of said annular magnetic field member so as to completely surround and contact and support said tubular brush holders.

2. A dynamo-electric machine as defined in claim 1 wherein said annular magnetic field member is constituted by a ring of magnetized ferrite.

3. A dynamo-electric machine as defined in claim 1 wherein said plastic mass is constituted by a plastic selected from the group consisting of polyesters and polyurethanes alone or in combination.

4. A dynamo electric machine as defined in claim 1 wherein said plastic mass is constituted by a plastic selected from the group consisting of polyesters and polyurethanes alone or in combination, said plastic being charged with an inorganic powder filler material having a good heat conductivity characteristic.

5. A dynamo electric machine as defined in claim 4 wherein said inorganic powder filler material is selected from the group consisting of aluminum, silicon, antimony oxide and aluminosilicate.

6. A dynamo-electric machine as defined in claim 1 wherein each of said tubular brush holders is surrounded by a tubular cover of a supple plastic material such as polyethylene which lies in contact with the brush holder, said tubular covers being applied to said brush holders in advance of the said in situ applied molded mass.

7. A dynamo electric machine as defined in claim 1 and which further includes bushings for the machine shaft, said bushings being held in place by the same plastic mass which secures the inner periphery of said annular magnetic field member in place.

8. A dynamo electric machine as defined in claim 7 wherein said bushings are each surrounded by a tubular cover of hard plastic material which lies in contact with the bushing and which has a poor heat conductivity characteristic, said tubular cover being applied to said bushing in advance of the said in situ applied molded mass.

References Cited by the Examiner

UNITED STATES PATENTS

| 2,123,933 | 7/38 | Cotterman | 310—71 |
| 2,709,228 | 5/55 | Miller et al. | 310—43 |
| 3,095,516 | 6/63 | Moressee et al. | 310—268 |

MILTON O. HIRSHFIELD, *Primary Examiner.*